V. E. JOSSENBERGER.
MOTOR MOUNTING FOR AERIAL VEHICLES.
APPLICATION FILED NOV. 14, 1919.
1,366,262.
Patented Jan. 18, 1921.
3 SHEETS—SHEET 3.
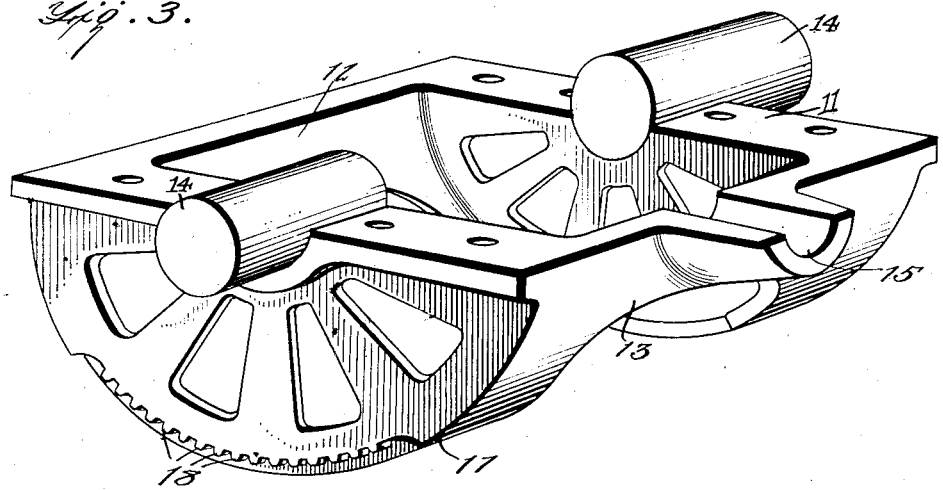
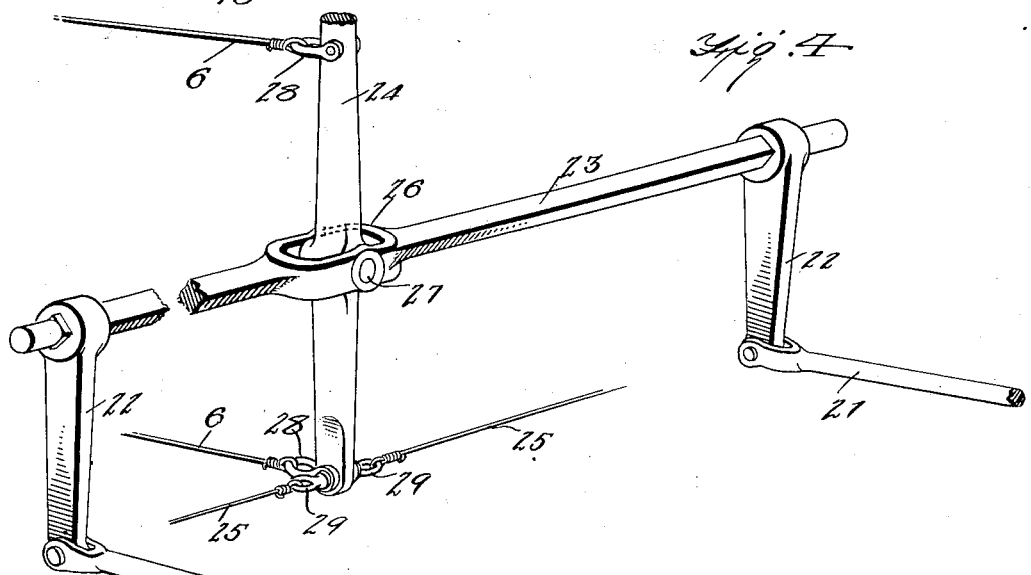
WITNESSES
INVENTOR
VIC E. JOSSENBERGER,
BY
ATTORNEYS

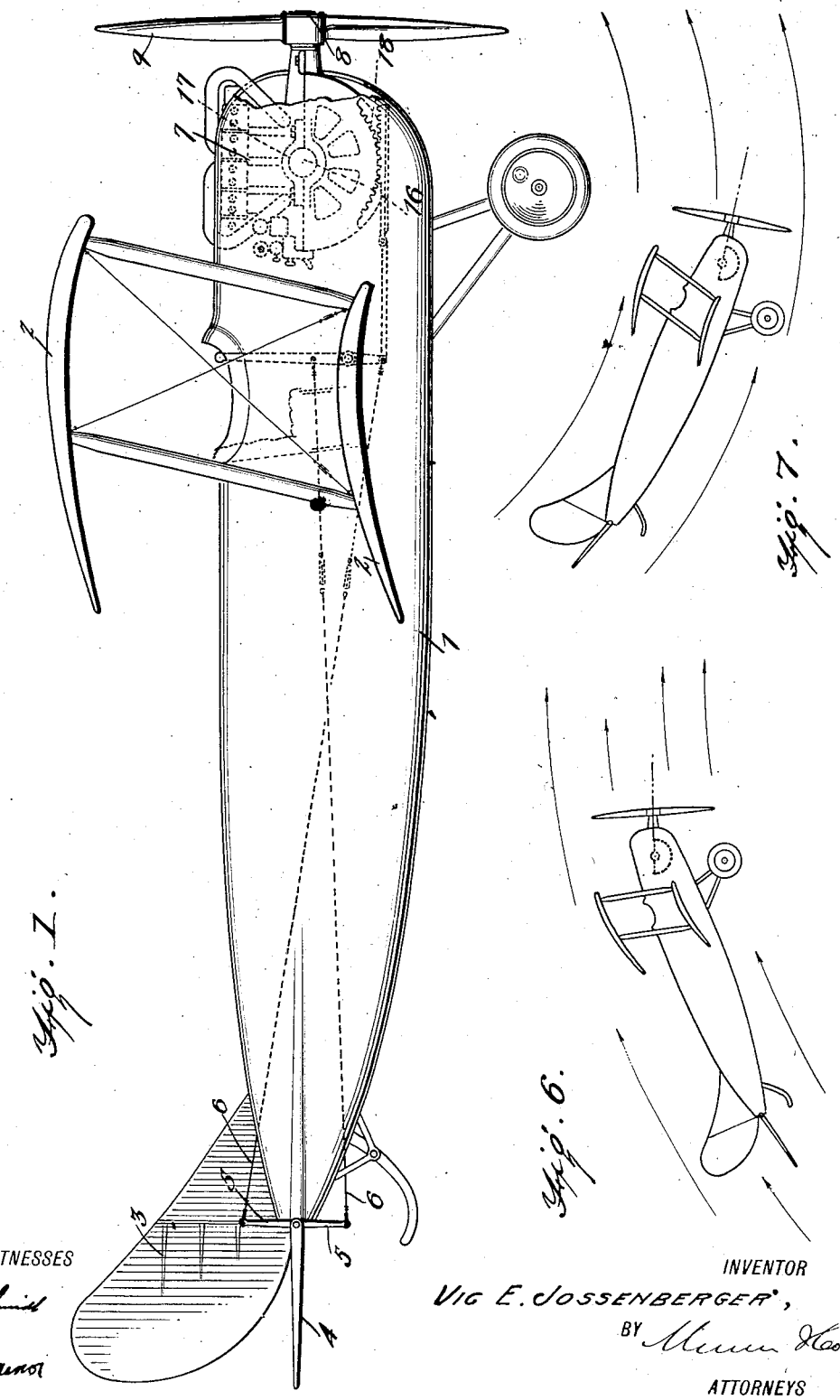

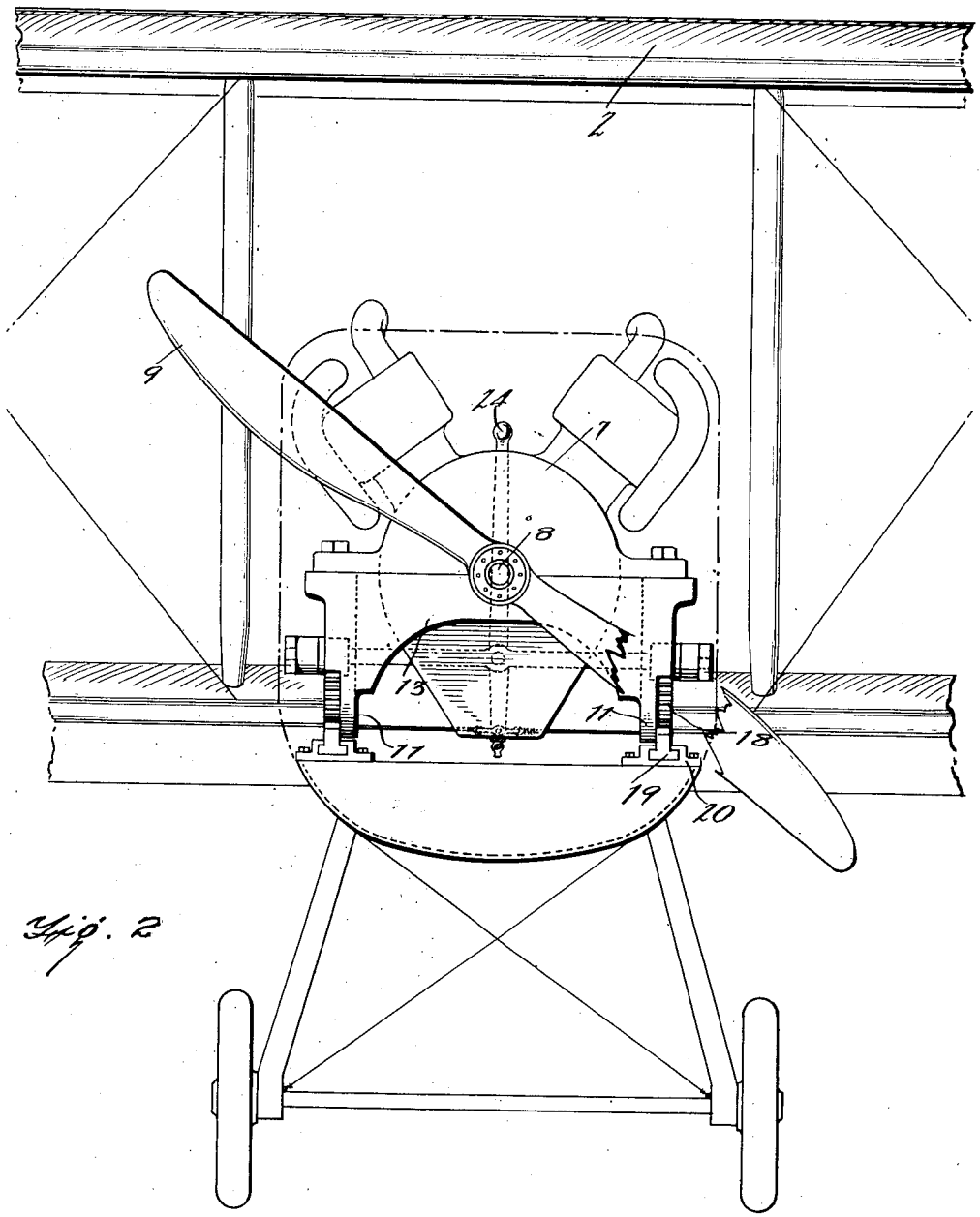

UNITED STATES PATENT OFFICE.

VIC EMANUAL JOSSENBERGER, OF LOS ANGELES, CALIFORNIA, ASSIGNOR OF THIRTY-NINE PER CENT. TO EDWIN E. HAWLEY, OF LOS ANGELES, CALIFORNIA.

MOTOR-MOUNTING FOR AERIAL VEHICLES.

1,366,262.  Specification of Letters Patent.  Patented Jan. 18, 1921.

Application filed November 14, 1919. Serial No. 337,937.

*To all whom it may concern:*

Be it known that I, VIC EMANUAL JOSSENBERGER, a citizen of the United States, and a resident of Los Angeles, in the county of Los Angeles and State of California, have invented certain new and useful Improvements in Motor-Mountings for Aerial Vehicles, of which the following is a specification.

My invention is an improvement in motor mountings for aerial vehicles, and has for its object to provide in vehicles of the character specified a mounting such that the axis of the propeller may be shifted to shift the plane of the propeller and the direction of the pull, to overcome emergencies of every character, such as, for instance, to right the machine in nose dives, nose spins, tail spins, side slip or maple leaf, and for permitting the machine to be extricated from air pockets and to assist in rising and in landing.

In the drawings:

Figure 1 is a side view of an aerial vehicle provided with the improved motor mounting;

Fig. 2 is a front view of a part of the vehicle, with parts broken away;

Fig. 3 is a perspective view of the bed plate;

Fig. 4 is a similar view of the control mechanism;

Fig. 5 is a partial perspective view of one of the guides;

Figs. 6 and 7 are diagrammatic views showing the manner of operation of the device.

The present embodiment of the invention is shown in connection with an aerial vehicle 1 of any usual or desired construction, the said vehicle having the supporting planes 2, the vertical rudder 3 and the horizontal rudder 4, the said horizontal rudder being movable and having oppositely extending arms 5, whose ends are connected with controlling members 6 for swinging the rudder. The motor 7, which may be of any usual or desired construction drives the propeller shaft 8 to which is secured the propeller 9.

This motor is supported by the base or bed shown in Fig. 3. The said bed is a substantially rectangular frame, consisting of end members 11 and connecting members 12 and 13 connecting the end members, each of the end members 11 being the segment of a circle and being arranged with its rounded surface downward. Each of the said end members or segments carries a journal pin 14.

The motor rests within the bed or frame, between the members 11, 12 and 13, and the member 13 has the lower section 15 of a bearing for the propeller shaft 8. The journal pins 14 are journaled in bearings on the frame of the vehicle, and detachable bearing sections are provided for engaging the journal pins. It will be evident from the above that the entire motor and its bed may swing on the journal pins to vary the inclination of the axis of the propeller.

Each of the end members 11 of the bed has a series of gear teeth 18 concentric with the journal pin 16, and each series of teeth is engaged by the teeth of a rack bar 19. These rack bars are mounted to slide in guiding shoes 20 shown more particularly in Fig. 19, each guiding shoe having overlying flanges for engaging the rack bar as shown in Fig. 2.

The rack bars are of inverted T-shape, and the overlying flanges of the shoes 20 engage over the extended edges of the rack bars. Each rack bar is connected by a link 21 with a radial arm 22 on a controlling shaft 23 which is journaled in suitable supports in the frame, and a lever 24 is connected with the shaft for operating the shaft.

This lever is connected with the upper and lower ends 3 of the flexible members 6 which run to the movable rudder, the said members being crossed between the arms 5 and the lever 24. Other flexible members 25 lead from the opposite sides of the lower end of the lever 24 to the ailerons, so that by means of the lever 24 the horizontal rudder, the ailerons and the propeller may be simultaneously controlled. As shown in Fig. 4, the shaft 23 is square and engages square openings in the radial arms 22. At its center it has a loop 26 through which passes the lever 24, and the lever is pivoted to the loop by a pivot pin 27.

The flexible members 6 are connected to stirrups 28 pivoted to the lever, and the flexible members 25 are connected with eyes 29 which are arranged at opposite sides of the lever. It will be obvious that a separate control might be provided for the motor 2, if desired, to shift the same independently of the shifting of the ailerons and the horizontal rudder.

In ascending, the axis of the propeller will be inclined upwardly, until the desired height is reached, when it will be inclined toward the horizontal, flattening out the flight of the vehicle. In nose spins or nose dives, the propeller axis may be shifted to positively and quickly shift the nose of the vehicle to prevent such nose spin, and to overcome the nose dive. It will be obvious that with the shifting axis or independent motor bed, a much more perfect control is permitted over the movements of the vehicle than in the usual case.

I claim:

In an aerial vehicle, the combination with the motor and the propeller shaft, of a bed on which the motor is mounted, said bed having oppositely extending alined journal pins whose axis is transverse to the axis of the motor shaft, said pins being journaled in fixed supports, the bed having depending toothed segments, and a rack bar for each segment, fixed guides for the rack bars, said bars meshing with the teeth of the segments, and means for simultaneously moving the bars, a shaft having cranks connected with the rack bars, a lever extending transversely of the shaft for oscillating the same intermediate the ends thereof, flexible connections between the lever above and below the shaft and the control for the elevating planes.

VIC EMANUAL JOSSENBERGER.